US006189373B1

(12) United States Patent
Ray

(10) Patent No.: US 6,189,373 B1
(45) Date of Patent: Feb. 20, 2001

(54) SCANNING FORCE MICROSCOPE AND METHOD FOR BEAM DETECTION AND ALIGNMENT

(75) Inventor: David J. Ray, Agoura Hills, CA (US)

(73) Assignee: Ray Max Technology, Inc., Agoura Hills, CA (US)

(*) Notice: Under 35 U.S.C. 154(b), the term of this patent shall be extended for 0 days.

(21) Appl. No.: 09/183,195

(22) Filed: Oct. 31, 1998

Related U.S. Application Data

(63) Continuation of application No. 08/950,030, filed on Oct. 14, 1997, now Pat. No. 5,861,550.

(51) Int. Cl.7 ...................................................... G01B 5/28
(52) U.S. Cl. ................................................................ 73/105
(58) Field of Search ............................ 73/105; 250/306, 250/307

(56) References Cited

U.S. PATENT DOCUMENTS

| Re. 34,489 | 12/1993 | Hansma et al. ....................... 250/260 |
| Re. 35,514 | 5/1997 | Albrecht et al. ...................... 250/216 |
| 4,935,634 | 6/1990 | Hansma et al. ....................... 250/260 |
| 5,025,658 | 6/1991 | Elings et al. ............................. 73/105 |
| 5,144,833 | 9/1992 | Amer et al. ............................... 73/105 |
| 5,172,002 | 12/1992 | Marshall ................................ 250/561 |
| 5,189,906 | 3/1993 | Elings et al. ............................. 73/105 |
| 5,206,702 | 4/1993 | Kato et al. .............................. 356/358 |
| 5,231,286 | 7/1993 | Kajimura et al. ..................... 250/234 |
| 5,245,863 | 9/1993 | Kajimura et al. ....................... 73/105 |
| 5,260,824 | 11/1993 | Okada et al. ........................... 359/368 |
| 5,388,452 | 2/1995 | Harp et al. ............................... 73/105 |
| 5,394,741 | 3/1995 | Kajimura et al. ....................... 73/105 |
| 5,406,833 | 4/1995 | Yamamoto ............................... 73/105 |
| 5,440,920 | 8/1995 | Jung et al. ............................... 73/105 |
| 5,463,897 | 11/1995 | Prater et al. ............................. 73/105 |
| 5,481,908 | 1/1996 | Gamble ................................... 73/105 |
| 5,496,999 | 3/1996 | Linker et al. ......................... 250/306 |
| 5,524,479 | 6/1996 | Harp et al. ............................... 73/105 |
| 5,560,244 | 10/1996 | Prater et al. ............................. 73/105 |
| 5,587,523 | 12/1996 | Jung et al. ............................... 73/105 |
| 5,625,142 | 4/1997 | Gamble et al. .......................... 73/105 |
| 5,701,381 | 12/1997 | Saurenbach et al. ................. 385/139 |
| 5,705,814 | 1/1998 | Young et al. ......................... 250/306 |
| 5,714,682 | 2/1998 | Prater et al. ............................. 73/105 |
| 5,714,756 | 2/1998 | Park et al. ............................ 250/306 |
| 5,756,997 | 5/1998 | Kley ..................................... 250/306 |
| 5,760,300 | 6/1998 | Kajimura ................................. 73/105 |

OTHER PUBLICATIONS

Steven M. Clark et al; "A High Performance Scanning Force Microscope Head Design"; Apr. 1993; pp. 904–907; Rev. Sci. Instruments 64(4).

Kees. O. Van Der Werf et al.; "Compact Stand–Alone Atomic Force Microscope"; Oct. 1993; pp. 2892–2897; Rev. Sci. Instruments 64(10).

B. Gasser et al.; "Design of a 'Beetle–Type' Atomic Force Microscope Using the beam Deflection Technique"; May 1996; pp. 1925–1929; Rev. Sci. Instruments 67(5).

Y. Martin et al; "Atomic Force Microscope–Force Mapping and Profiling on a Sub 100 Å Scale"; May 15, 1987; pp. 4723–4729; J. Appl. Physics 61(10).

P.S. Jung et al; "Novel Stationary–Sample Atomic Force Microscope with Beam–Tracking Lens"; Feb. 4, 1993; pp. 264–266; Electronic Letters vol. 29 No. 3.

David R. Baselt et al; "Scanning Cantilever Atomic Force Microscope"; Apr. 1993; pp. 908–911; Rev. Sci. Instruments 64(4).

Primary Examiner—Robert Raevis

(57) ABSTRACT

A scanning force microscope (10) sometimes referred to as an atomic force microscope employs a laser (32) and a cantilever (28) which move proportionally to a moving reference frame (64). A fixed reference frame (11) contains optical components. A scanning mechanism creates relative movement between the fixed and moving reference frames. An optical assembly (114) is included which comprises at least one optical device in the fixed reference frame. The optical assembly permits initial alignment of the laser beam onto the cantilever and also permit the laser beam to follow the moving cantilever.

17 Claims, 8 Drawing Sheets

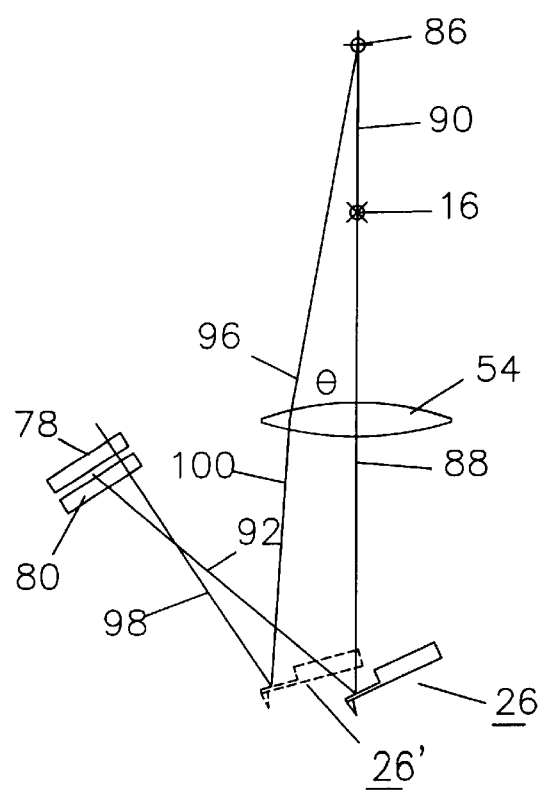
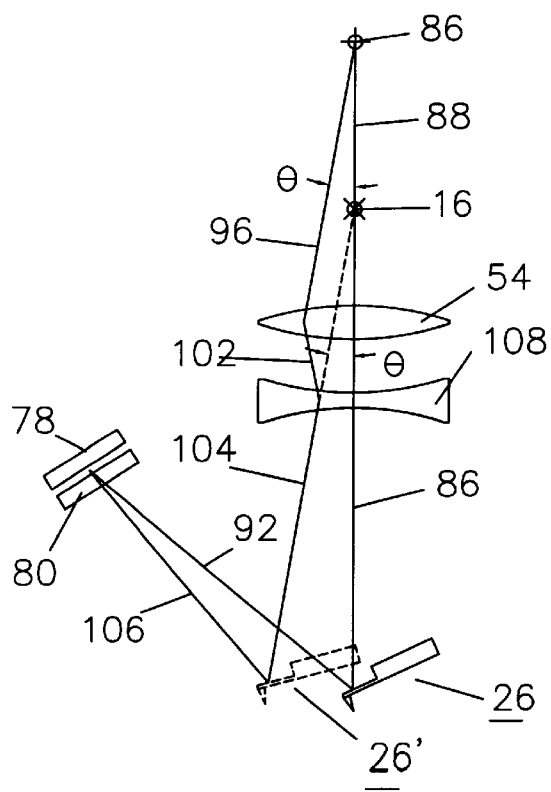
FIG. 1D
FIG. 1E

SCANNING FORCE MICROSCOPE AND METHOD FOR BEAM DETECTION AND ALIGNMENT

This is a continuation of application Ser. No. 08/950,030, filed Oct. 14, 1997, which is incorporated by reference herein, now U.S. Pat. No. 5,861,550.

BACKGROUND

1. Field of the invention

This invention relates to scanning force microscopes, sometimes referred to as atomic force microscopes, using light beam detection schemes.

2. Description of Prior Art

Conventional optical microscopes used to observe the surface features of materials begin to lose resolution when the dimensions of the surface features approach one half the wavelength of visible light. Alternate types of microscopes have been developed to overcome this limit. Confocal microscopes, for example, can improve on conventional optical limits. Scanning electron microscopes image small surface features by the use of energized electrons that have wavelengths shorter than photons. However, many of these alternate techniques have limits of their own and may have other disadvantages in implementation such as a need to place the sample in a vacuum chamber.

A new class of microscopes overcomes the resolution limits of previous techniques in a fairly simple manner. Microscopes in this class are referred to as probe microscopes. The topographical version of these new microscopes uses a fine pointed stylus to interact with some parameter of the sample surface. A scanning mechanism creates relative motion between the stylus and the sample surface. When a measurement is made of this interaction, the surface topography of the sample can be imaged with height as well as lateral detail. One of the more commercially successful microscopes in this class is the scanning force microscope also referred to as a scanning force microscope. Sample features other than topography can be measured with probe microscopes. For example, when measuring the interaction of a magnetic probe with the magnetic fields of the sample, an image of the magnetic domains of the sample can be created.

For topographical operation the stylus is mounted orthogonally to the longer dimension of a cantilever such that the cantilever acts as a bending lever. A cantilever is a lever with a constrained end and a free end. The stylus is mounted near the free end. The cantilever deflects due to the force applied to the stylus as the stylus interacts with the sample surface. The combination of a stylus and cantilever are referred to as a probe assembly. The cantilever has a very weak spring constant and may noticeably deflect when a force as small as one nanonewton is applied to its free end. A detection mechanism provides a signal to a feedback loop when the cantilever deflects. When relative lateral motion exists between the stylus and the sample surface, the changing topography under the stylus creates a force on the stylus which the stylus transmits to the free end of the cantilever. This results in a slight change in the angle of the free end of the cantilever. A lateral drive mechanism creates relative lateral motion between the stylus and sample. The feedback loop controls a vertical drive mechanism which moves the fixed end of the cantilever toward and away from the sample surface. Consequently, the free end of the cantilever surface is held at a nearly constant bend angle. The lateral and vertical drive mechanisms are referred to as a scanning mechanism.

By measuring the vertical drive signal and the lateral position of the stylus over the sample, a matrix of x, y and z values may be created. This matrix describes the surface topography of the sample.

The surface of the cantilever is at least partially reflecting. The deflection of the free end of the cantilever is measured by directing a laser beam onto the free end, and by measuring the position of the reflected beam. The stylus is mounted on the surface opposite the reflecting surface of the cantilever. Further, an array of two or more light-sensitive devices may be used to detect the position of the reflected beam. These devices then produce electrical signals which are related to the cantilever deflection. The difference of the two signals is proportional to the amount of the cantilever deflection in one direction. Four light-sensitive devices arrayed in a quadrant can measure the amount of cantilever deflection in two orthogonal directions. The vertical drive mechanism receives signals processed from the output of the light-sensitive devices. This creates the feedback loop that controls the bend angle of the cantilever.

Prior art devices constructed as described above are shown in U.S. Pat. No. 4,935,634 to Hansma et al, and U.S. Pat. No. 5,144,833 to Amer et. al. These prior art devices move the sample laterally and vertically under a stationary stylus while detecting the cantilever deflection with the laser beam apparatus described above. This method has a disadvantage stemming from the limited force capability of the lateral and vertical drive mechanisms. The sample mass may be large compared to the force created by the drive mechanisms. In such cases the sample may either move very slowly or not move at all under the stylus.

Prior art microscopes described in U.S. Pat. No. 5,481,908 and its continuation U.S. Pat. No. 5,625,142 to Gamble maintain a fixed sample and move the laser, the cantilever, and all of the associated mechanisms that are necessary to make initial adjustment of the laser beam. Since the laser moves with the cantilever, the laser beam follows the motion of the cantilever during scanning. The mass associated with moving part of such microscopes limits the speed at which the image data can be taken.

Other prior art microscopes attempt to overcome the disadvantage of moving the sample by using an interferometric method to track a moving cantilever. These microscopes are described in U.S. Pat. No. 5,025,658 and its continuation U.S. Pat. No. 5,189,906 to Elings et al. Further, prior art microscopes use moving beam steering optics with a stationary laser source as described in U.S. Pat. No. 5,524,479 which is a continuation of U.S. Pat. No. 5,388,452 to Harp and Ray and in U.S. Pat. No. 5,463,897 with associated continuation U.S. Pat. No. 5,560,244 to Prater et al as well as U.S. Pat. No. 5,440,920 and its continuation U.S. Pat. No. 5,587,523 to Jung et. al. These techniques employ a fixed position laser and moving optical elements. The optical elements move with the moving probe assembly. The result is a lateral redirecting of the laser beam which then follows the moving surface of the cantilever.

These systems must move optical components with the cantilever. This adds mass to the moving part of the system. These systems also position the laser in a location above the cantilever. This position may preclude simultaneous optimum optical viewing from positions above the cantilever and sample. The lateral and vertical drive mechanisms must accommodate the potentially significant added mass of the moving optical devices by providing additional force. The result is a significant limit to the velocity of the stylus over the sample. In addition, if one wishes to optically observe the probe assembly from certain angles it may be necessary to place additional mirrors or other optical devices on the moving part of the microscope. Further, mechanisms often are needed to adjust the laser over a range of angles, in order to initially bring the beam onto the reflecting surface of the cantilever.

In probe microscopes it is often necessary to change the probe assembly as the result of a blunted stylus. This is caused either by wear or by small particles which become attached to the stylus as it scans over the sample. Also the stylus may break. When the probe assembly is replaced, the replacement assembly often is not in exactly the same position relative to the laser and associated optical assemblies. Consequently, the laser beam angle normally must be adjusted to restore the beam to its proper position on the reflecting surface of the cantilever. In prior art microscopes the mass of the adjustment mechanisms adds to the moving portion of the microscope. Other alternate prior art techniques attach devices to the scanning mechanism which adjust the probe laterally. The scanning mechanism often consist of thin walled piezoelectric tubes which are quite fragile. The operator may apply too much force when adjusting the probe lateral adjustment mechanism thus damaging or breaking the tube.

OBJECTS AND ADVANTAGES

The present invention offers novel advantages over the prior art in the following respects:

(a) the mass of the moving portion of the microscope is reduced;

(b) the laser beam may be adjusted, such that it illuminates the surface of the cantilever, by linkages which are not physically connected to fragile moving parts such as the lateral and vertical drive mechanism;

(c) the laser beam adjustment is simple and the method is easily implemented;

(d) visual access to the probe assembly is improved; and (e) the laser beam tracks the motion of the probe assembly with minimal error.

SUMMARY OF THE INVENTION

In my scanning force microscope a low mass laser is mounted in the moving frame of reference of the cantilever and stylus. A novel optical system is employed with components mounted in a moving frame of reference and in a fixed frame of reference. This allows initial adjustment of the laser beam onto the cantilever while allowing the beam to track the cantilever during scanning. It also maintains low mass for the moving part of the microscope.

BRIEF DESCRIPTION OF THE DRAWINGS

FIG. 1D schematically shows beam paths for a corrected beam.

FIG. 1E schematically shows beam paths for a beam corrected with a second compensation lens.

DESCRIPTION OF THE INVENTION WITH REFERENCE TO THE DRAWINGS

Figure 1:
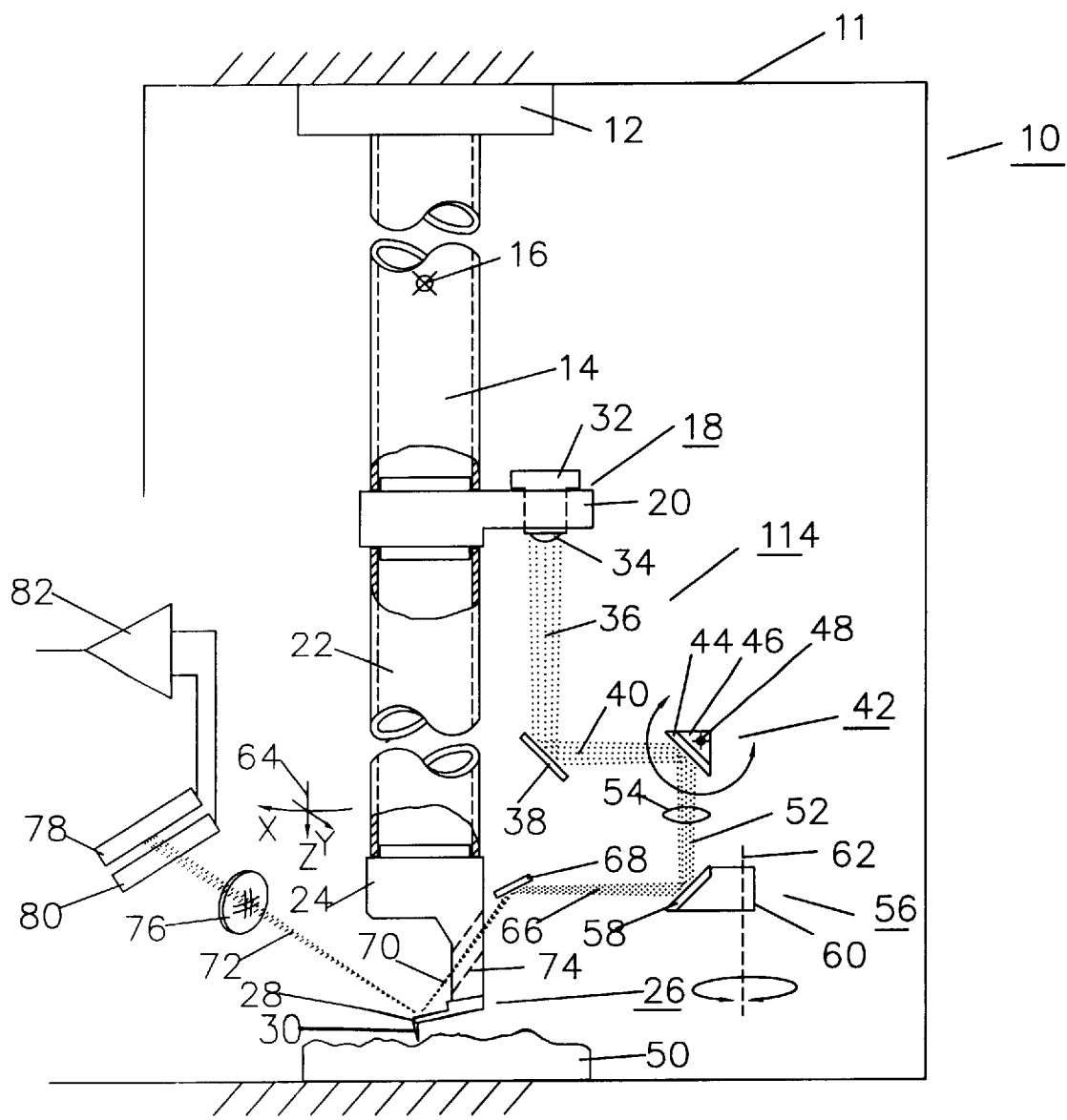
FIG. 1 shows a scanning force microscope employing a first embodiment of the invention in which a laser and probe are in a moving frame of reference. An optical assembly is in a fixed frame of reference but allows adjustment of the laser beam.

A preferred embodiment of the invention is given in FIG. 1. A microscope 10 has a fixed reference frame 11. A scanner mount 12 attaches a lateral driver 14 to fixed reference frame 11. Lateral driver 14 may be in the form of a piezoelectric tube with electrodes (not shown). The free end of lateral driver 14 appears to rotate around a mechanical pivot 16. Mechanical pivot 16 is located approximately at the mid point between the fixed and free end of lateral driver 14. A laser coupler assembly 18 couples the free end of lateral driver 14 to the upper end of a vertical driver 22 and also carries a laser 32 in the x and y directions. Laser 32 has a focusing lens 34 which produces a converging beam of light with a first segment 36.

Vertical driver 22 may be a piezoelectric tube with electrodes (not shown). A probe assembly holder 24 is connected to the lower end of vertical driver 22 and supports a probe assembly 26. First beam segment 36 impinges on a first fixed mirror 38 resulting in a second beam segment 40. Second beam segment 40 impinges on a lateral adjustable mirror 44 which is attached to a lateral adjustable mirror support 46. Mirror support 46 pivots about a lateral adjustable mirror axis 48. Lateral adjustable mirror 44 and mirror support 46 compose a lateral adjustable mirror assembly 42. A third beam segment 52 extends through a fixed compensation lens 54 and impinges on a vertical adjustable mirror 58.

Mirror 58 is supported on a vertical adjustable mirror support 60 which rotates about a vertical adjustable mirror axis 62. Mirror 58 and mirror support 60 compose a vertical adjustable mirror assembly 56. A fourth beam segment 66 reflects from mirror 58 and impinges on a second fixed mirror 68 resulting in a fifth beam segment 70. Beam segment 70 passes through a probe holder throughbore 74 and then impinges on a cantilever 28. A stylus 30 reacts to forces generated by the proximity of a sample 50 and further transmits the forces to cantilever 28. Cantilever 28, stylus 30 and a die 112 shown in FIG. 1B form probe assembly 26. The motion of the lower end of vertical driver 22 creates a moving frame of reference 64 relative to fixed reference frame 11. All optical components in either fixed reference frame 11 or in moving reference frame 64 and in the light path between laser 32 and cantilever 28 create an optical assembly 114. A sixth beam segment 72 reflects from cantilever 28 and passes through a beam sizing lens 76 and then impinges either on a first photodiode 78 or a second photodiode 80 or both. Electrical signals from first and second photodiodes 78 and 80 are routed to a difference amplifier 82.

Figure 1A:
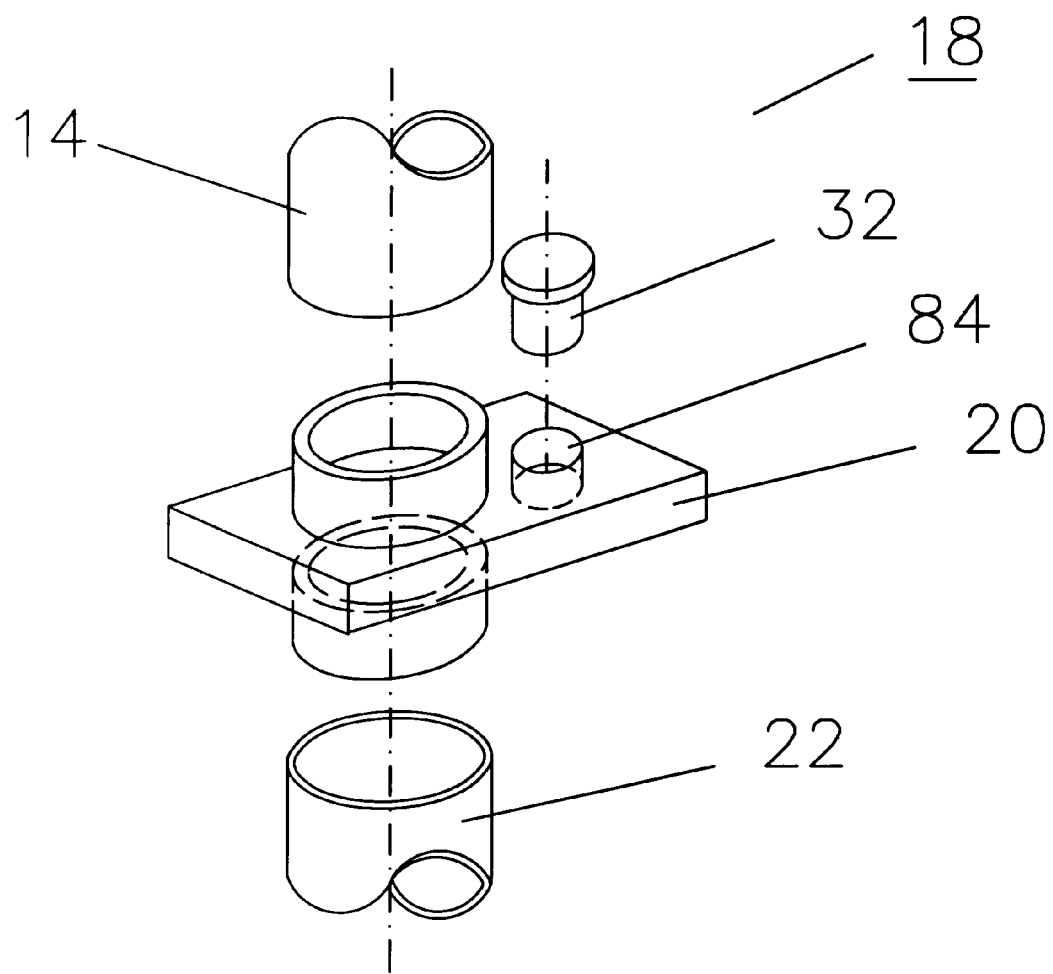
FIG. 1A describes a coupling assembly used in the invention.

FIG. 1A shows laser coupler assembly 18 which consists of a laser holder 20 and laser 32 which is inserted into a coupler throughbore 84. Laser coupler assembly 18 then couples lateral driver 14 and vertical driver 22 together to provide for proportional motion between laser 32 and cantilever 28.

Figure 1B:
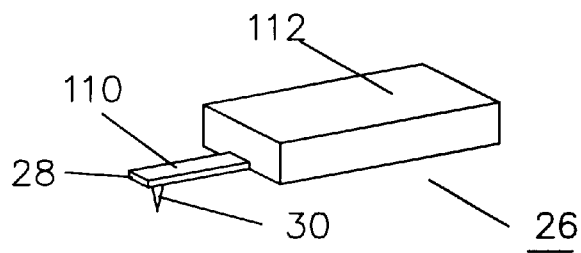
FIG. 1B shows a typical probe assembly.

FIG. 1B shows probe assembly 26 with die 112 which supports cantilever 28. Cantilever 28 has an upper surface 110 which is at least partially reflecting. Stylus 30 is supported on the surface of cantilever 28 opposite upper surface 110. Cantilever 28 has a weak spring constant and will deflect measurably with as little as one nanonewton of force applied to stylus 30.

Figure 1C:
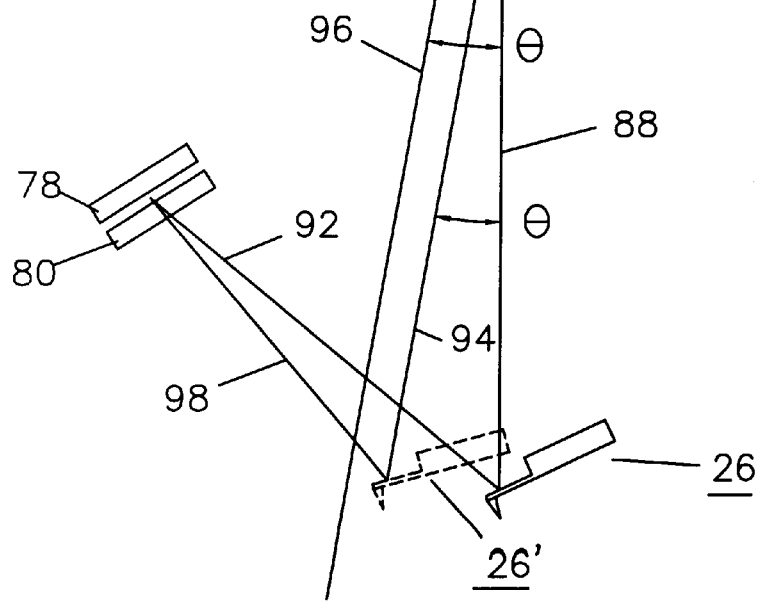
FIG. 1C schematically shows beam paths for an uncorrected beam.

FIG. 1C diagrams, in the absence of any compensating optical devices, an uncorrected light beam path 96. During scanning, probe assembly 26 rotates through an angle θ which is typically less than 0.2 degrees. For such small angles of θ, probe assembly 26 rotates approximately around mechanical pivot 16 to an alternate position shown as a rotated probe assembly 26'. Probe assembly 26 is at the physical length of a center path 88 from mechanical pivot 16. The light following center path 88 reflects from probe assembly 26 along a center reflected path 92. A rotated center light path 94 shows the desired path of the light beam for rotated probe assembly 26'. Uncorrected light beam path 96 also rotates through angle θ, however, because the optical path is longer by an extended distance 90, path 96 rotates around an optical pivot 86. The result is that the light beam following path 96 misses rotated probe assembly 26' and is not reflected back to photodiodes 78 and 80.

FIG. 1D shows fixed compensation lens 54 in uncorrected light beam path 96. Now, the beam is refracted towards rotated probe assembly 26' along a corrected beam path 100. The reflected beam from probe assembly 26 follows center reflected path 92 and impinges near a center position on photodiodes 78 and 80. However, the reflection of the light beam on corrected path 100 results in a light beam following a rotated reflected beam path 98. Path 98 impinges on photodiodes 78 and 80 at a slightly different location from the beam on center reflected path 92. The location error in position may be corrected in software since the error is a predictable function of the position of assembly 26' as it rotates in the x and y directions. The error is minimal because in actual practice the angle θ is typically less than 0.2 degrees. The focal length and position of compensation lens 54 is calculated using its position relative to optical pivot 86 and standard formulas which relate the focal, image and object distances of lenses.

FIG. 1E shows a method of compensating for angular errors. Probe assembly 26 rotates to a position shown by rotated probe assembly 26' approximately around mechanical pivot 16. However, the light following path 96 rotates around optical pivot 86. Compensation lens 54 refracts beam path 96 to a first corrected light beam path 102. A second compensation lens 108 refracts first corrected light beam path 102 to a second corrected light beam path 104. Path 104 appears to emanate from and pivot around mechanical pivot 16. For small angles of θ, the light reflected from assembly 26' follows a reflected corrected beam path 106. Path 106 starts at rotated probe assembly 26' and arrives at nearly the same position on photodiodes 78 and 80 as the light which follows path 92.

Figure 2:
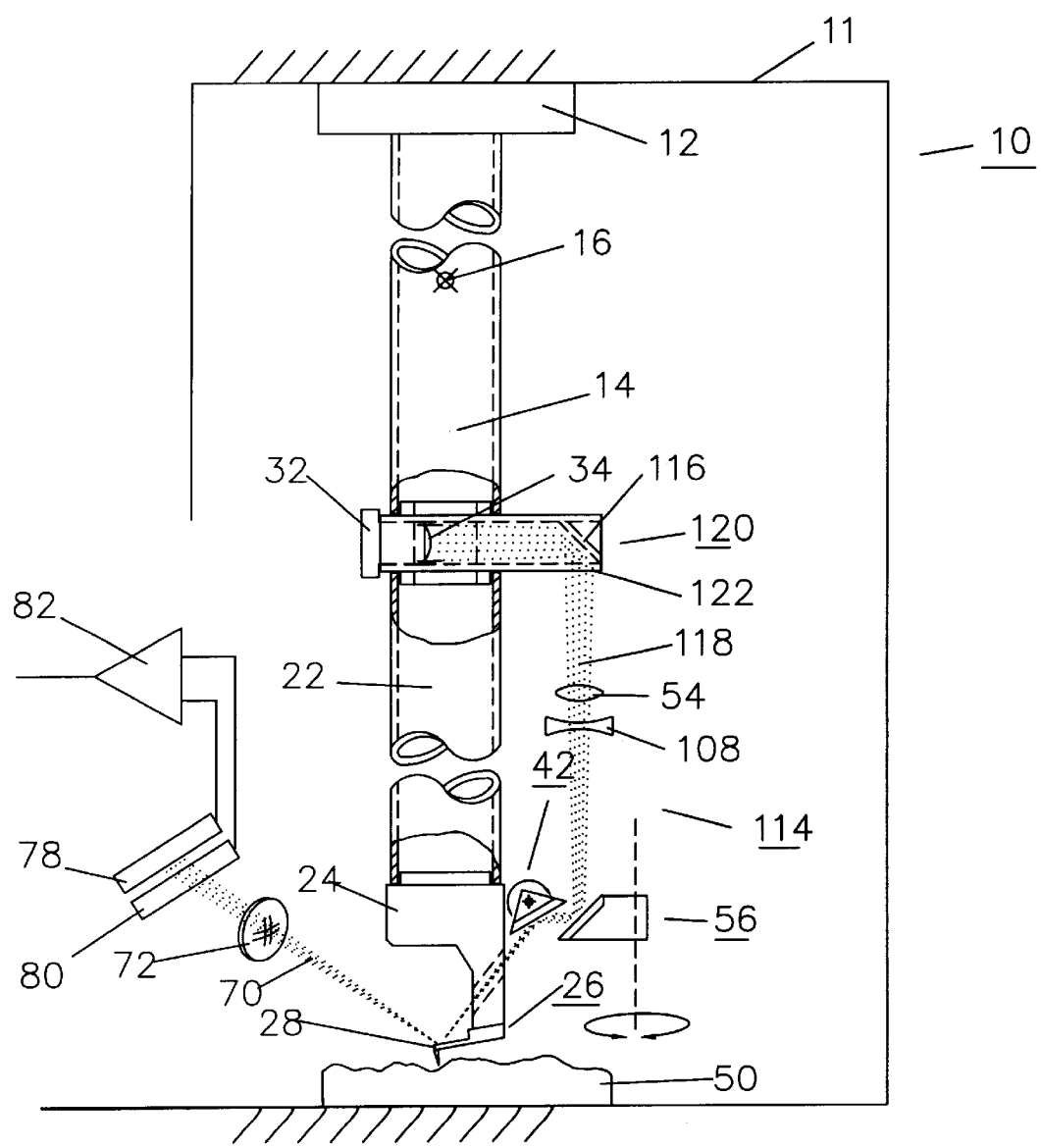
FIG. 2 shows a scanning force microscope employing a second embodiment of the invention in which the laser is mounted laterally.

FIG. 2 shows laser 32 and focusing lens 34 attached to a laser coupler mirror holder 122 which further carries a diverting mirror 116. Laser 32, diverting mirror 116 and holder 122 compose a laser coupler and mirror assembly 120. A diverted beam segment 118 passes through fixed compensation lens 54 and second compensation lens 108. Diverted beam segment 118 is reflected from mirror assembly 56 and then from lateral adjustable mirror assembly 42.

Figure 3:
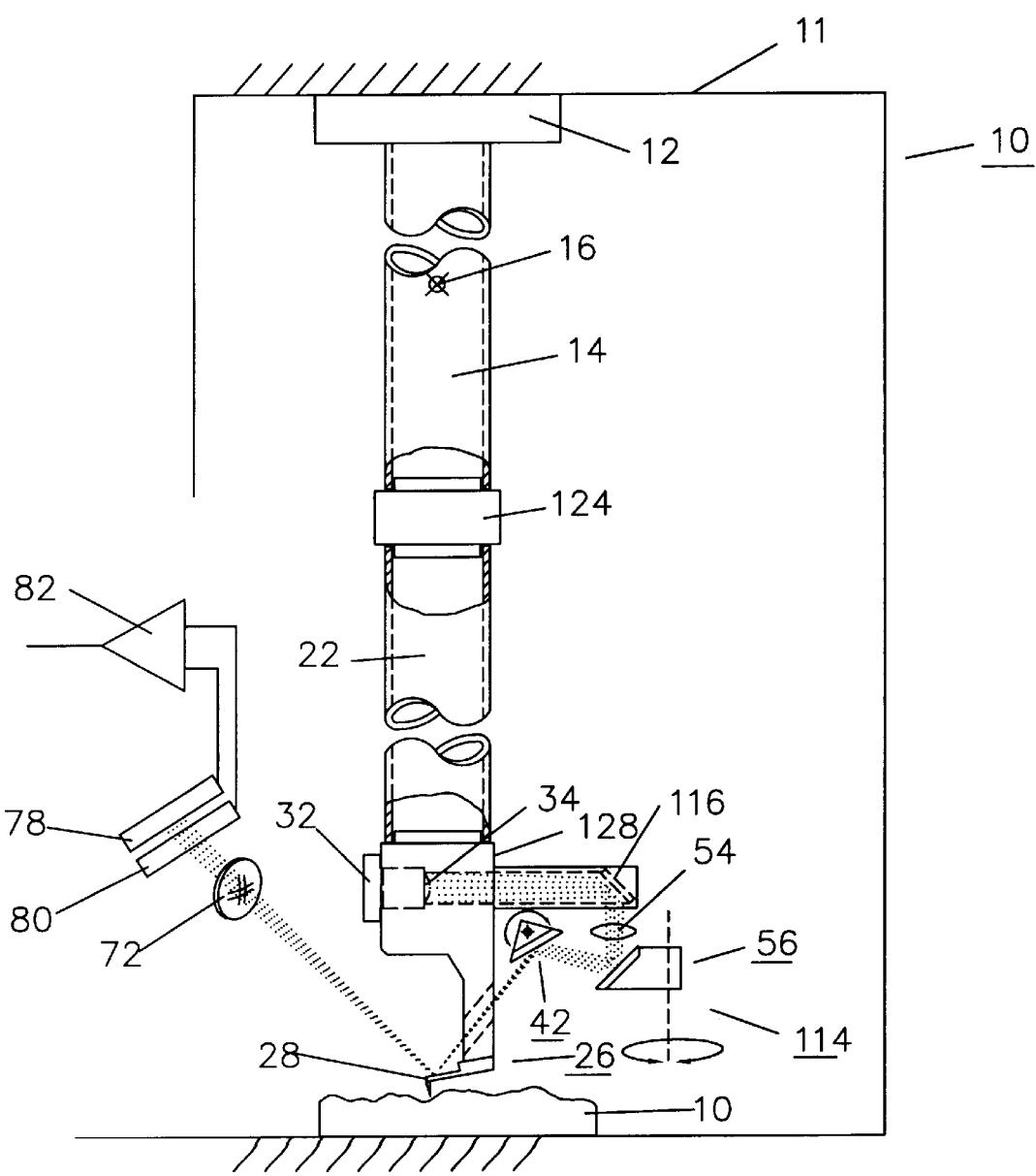
FIG. 3 shows a scanning force microscope employing a third embodiment of the invention in which the laser is placed at the lower end of the vertical driver.

FIG. 3 shows laser 32 and focusing lens 34 attached to a laser mirror probe holder 128 which is attached to the lower end of vertical driver 22. A coupler 124 connects lateral driver 14 to vertical driver 22.

Figure 4:
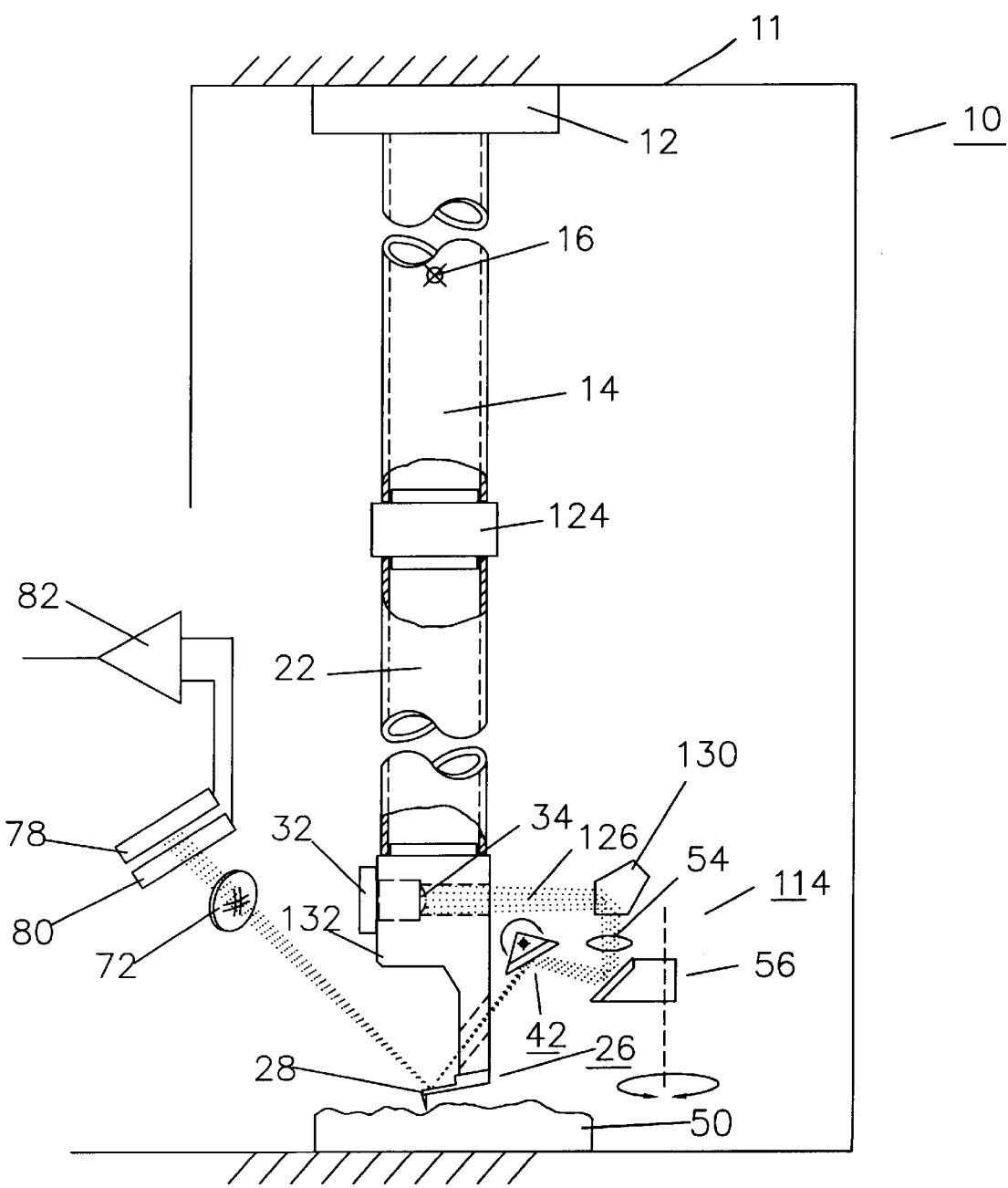
FIG. 4 shows a scanning force microscope employing a fourth embodiment of the invention employing a pentagon prism.

FIG. 4 shows laser 32 and focusing lens 34 attached to a laser probe holder 132. A laser initial beam path 126 leads to a pentagon prism 130 and then is directed to mirror assembly 56 and then to lateral adjustable mirror assembly 42.

Figure 5:
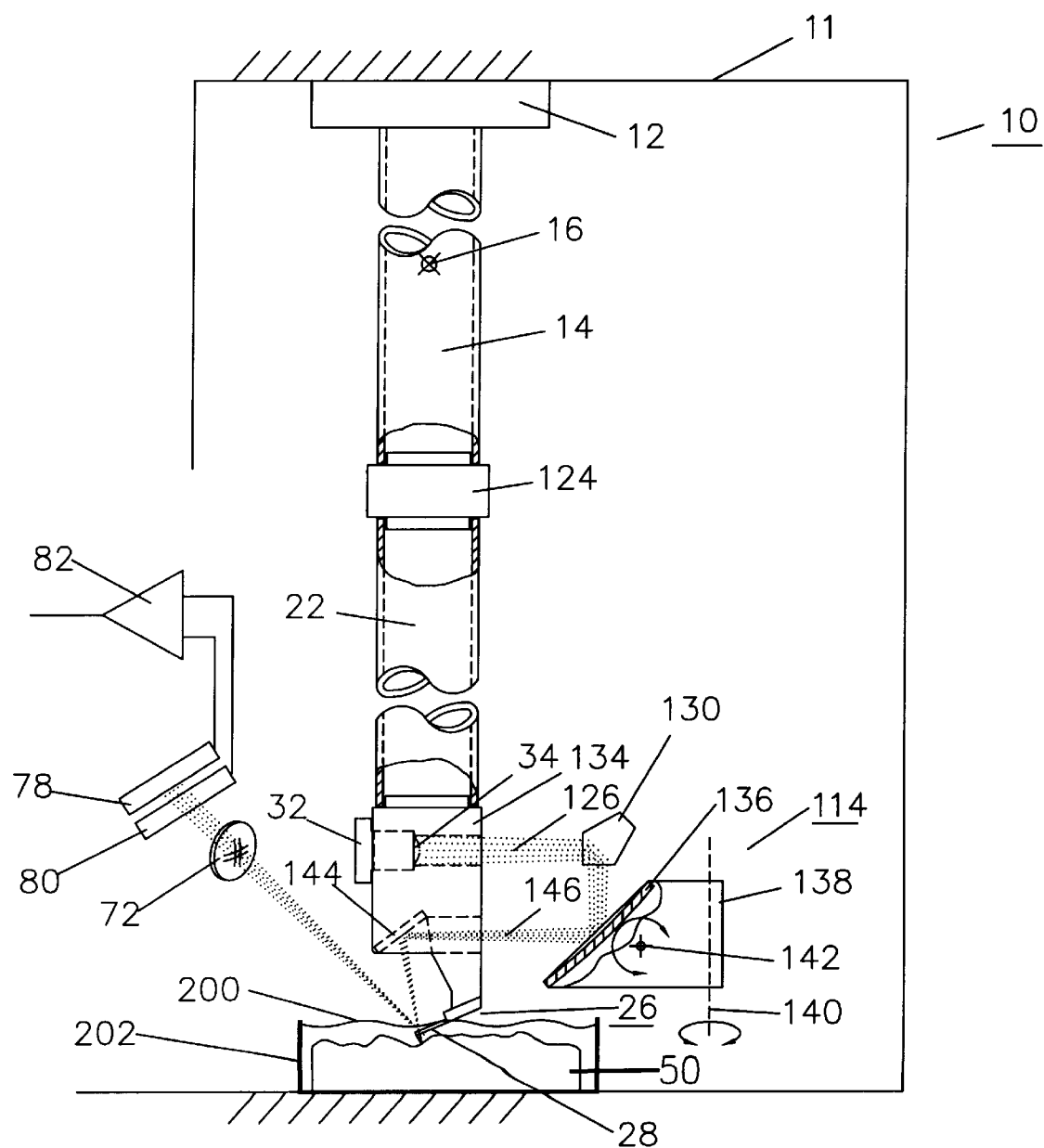
FIG. 5 shows a scanning force microscope employing a fifth embodiment of the invention using an adjustable spherical mirror.

FIG. 5 shows beam path 126 impinging on pentagon prism 130 and subsequently impinging on a spherical mirror 136. Laser 32, probe assembly 26, and a probe mirror 144 are supported by an alternate holder 134. Spherical mirror 136 is connected to a spherical mirror support 138 which can be rotated about a vertical axis 140 and a lateral axis 142. The light following a second beam path 146 then is reflected toward probe mirror 144 and subsequently to probe assembly 26. Sample 50 is immersed in a fluid 200 retained by a conventional container 202.

OPERATION OF THE INVENTION

Referring to FIG. 1 assists in understanding the operation of the first embodiment of the invention. For small angles of rotation, lateral driver 14 causes rotation of all parts and assemblies attached to its free end to rotate about mechanical pivot 16. Consequently, laser 32 and first beam segment 36 also rotate substantially about mechanical pivot 16. Lens 36 causes the light emitted from laser 32 to converge to approximately a point at cantilever 28. To an observer positioned to the right of mirror 38, beam segment 40 appears as if it were coming from the opposite or left side of mirror 38. The same is true for an observer viewing each reflected beam, i.e. the beam appears to come from the opposite side of each mirror as the beam continues on to mirror 44, mirror 58 and second fixed mirror 68.

Lateral and vertical adjustable mirrors 44 and 58 permit the beam to be adjusted such that it impinges on cantilever 28 before scanning starts. Compensation lens 54 redirects segment 52 causing it to follow cantilever 28 despite the difference between the optical path length and the mechanical path length as was seen in the description of FIG. 1D. It is important to note that compensation lens 54 also has an effect on the focus of beam segment 52. When calculating the focal length of focusing lens 34 this effect must be considered. The result is that beam segment 70 tracks the movement of cantilever 28 during scanning. Beam segment 72 reflects off cantilever 28 and continues through beam sizing lens 76 to impinge on photodiodes 78 and 80. The diameter of beam segment 72, when it reaches photodiodes 78 and 80, is increased or decreased by optional beam sizing lens 76 to a value which matches the physical size of photodiodes 78 and 80. Standard formulas relating the image, object, and focal length of lenses are used to calculated the focal length and position of lens 76. The focal lengths and positions of lenses 54 and 76 are calculated to sufficient accuracy using the thin lens formula:

$$\frac{1}{f} = \frac{1}{s} + \frac{1}{s'},$$

where $f$ is the focal length of the lens, s is the distance from the object to the lens, and s' is the distance from the lens to the image. The appropriate sign conventions must be followed when making the calculations.

As stylus 30 encounters different elevations on the surface of sample 50 the position of the reflected beam on the photodiodes will change. Electrical signals from photodiodes 78 and 80 are subtracted and amplified by difference amplifier 82. In response to feedback signals processed from the output of amplifier 82, vertical driver 22 expands and contracts in the z direction to move probe assembly 26 and probe assembly holder 24 vertically. Cantilever 28 bends under the influence of changes in the expansions and contractions of vertical driver 22. Cantilever 28, therefore, holds a nearly constant force on stylus 30 as the topographical features of sample 50 as pass under stylus 30.

In FIG. 2 the operation is similar that in FIG. 1 except that laser 32 is coupled to diverting mirror 116. Both laser 32 and mirror 116 rotate about mechanical pivot 16. This eliminates the need for first and second fixed mirrors 38 and 68 shown in FIG. 1. The positions of lenses 54 and 108 are determined by their selected focal lengths and the distance of the optical path taken by the light beam. Standard formulas for calculating focal, object and image distances for multiple lens systems can be used. Lenses 54 and 108 can be placed in the beam path between mirror assemblies 56 and 42 or between mirror assembly 42 and probe assembly 26. Before scanning begins the light beam is adjusted onto cantilever 28. During scanning, lenses 54 and 108 will cause the beam will follow cantilever 28 as it rotates about mechanical pivot 16.

FIG. 3 shows a further alternate method. Holder 128 supports laser 32. Diverting mirror 116 rotates with holder 128. Light from laser 32 is routed to cantilever 28 by refraction at lens 54 and by reflection from mirror assemblies 42 and 56. The beam reflects from cantilever 28 and impinges on photodiodes 78 and 80.

FIG. 4 shows how pentagon prism 130 is used to eliminate fixed mirrors 38 and 68 shown in FIG. 1. Prism 130 also eliminates diverting mirror 116 shown in FIG. 2. A pentagon prism has the property that it does not pervert the image as does a single plane mirror. Lens 54 causes the beam to follow cantilever 28 as it rotates around pivot 16. The reflected beam impinges on photodiodes 78 and 80.

FIG. 5 eliminates compensation lens 54 and the adjustable mirrors 44 and 58 of FIG. 1 by interposing adjustable spherical mirror 136. Mirror 136 is adjustable around vertical axis 140 and lateral axis 142. Probe mirror 144 rotates about pivot 16. Spherical mirror 136 compensates for the nearly spherical rotation of laser 32, probe mirror 144 and probe assembly 26. Pentagon prism 130 is used for conveniently redirecting path 126. For a generalized spherical mirror the radius of curvature is found from standard formulas relating the radius, image distance, and object distance. For light rays with an angle of approximately 0.2 degree or less, the radius of curvature is calculated with sufficient accuracy using the following formula:

$$\frac{2}{R} = \frac{1}{s} + \frac{1}{s'},$$

where R is the radius of curvature of a spherical mirror, s is the distance from the object to the mirror, and s' is the distance from the mirror to the image. The appropriate sign conventions must be followed when making the calculations.

SUMMARY, RAMIFICATIONS, AND SCOPE

With my scanning force microscope it is possible to adjust the laser beam onto the cantilever without mechanical linkages to either the lateral or vertical driver nor to any part that moves with the lateral or vertical driver. The light beam continues to track the motion of the cantilever as it scans over the surface of the sample. Further, by using low mass components the mass of the moving elements is reduced and the system is able to scan at a faster rate. The implementation is uncomplicated and straight forward.

While the description given above is quite specific and detailed it should not be considered to limit the scope of the invention but should instead be considered as only describing some examples of the invention. There are many alternate variations of the invention. For example, the lenses shown are double concave and double convex. They can be piano convex, piano concave, achromatic, cylinder, meniscus or graded index lenses. Roof prisms, porro prisms and right angle prisms can be substituted or added to the light beam path. Optical wedges can be used to refract the beam. The plane mirrors can have slightly curved surfaces such that they act similar to the compensation lenses shown. Further, optical fibers can be used to redirect the light beam.

The methods for rotating the adjustable fixed frame lenses and mirrors can employ lead screws, differential thread lead screws, or piezo-actuators or combinations of these.

The scanning mechanism can take many forms. The vertical and lateral drivers can be piezoelectric blocks, stacks, tubes or bimorphs. The vertical and lateral drivers can be actuated by piezoelectric devices or by magnetic or magnetostrictive devices. The vertical and lateral drivers can be combined into one device such as a single piezoelectric tube that can create relative motion in the x, y and z direction with respect to the sample surface.

The light source is a device capable of generating light and may be a laser, a light emitting diode, or an incandescent light source. The light detectors in the examples are photodiodes, but there are other types of devices such as phototransistors that can detect light. If an array of four or more light detecting devices is used, the lateral motion of the beam as well as the vertical motion can be detected.

The output signal from the difference amplifier can be processed to form a signal which actuates a motor which in turn drives the adjustable mirror assemblies mounted in the fixed reference frame. This makes possible automatic adjustment of the adjustable assemblies.

The scanning force microscope described here can operate with the sample submerged in fluids. Further, the microscope can operate by oscillating the cantilever and detecting some parameter of the oscillation such as the amplitude, frequency, or phase change in the electrical output signals as the oscillating cantilever approaches the proximity of the sample surface. The oscillating cantilever may actually come into intermittent contact with the sample surface.

In the examples given a stylus is used to create a bending action of the cantilever. However, other types of probes, such as magnetic probes, can be used to bend the cantilever.

Thus the scope of the invention should be determined by the appended claims and their legal equivalents, rather than by the examples given.

I claim:

1. A scanning force microscope comprising:
    (a) a fixed reference frame;
    (b) a moving reference frame;
    (c) scanning means for creating relative motion between said fixed reference frame and said moving reference frame;
    (d) a light source mounted in said moving reference frame adapted to provide a light beam;
    (e) an optical assembly mounted in said fixed reference frame, adapted to receive and transmit said light beam, containing at least one device selected from the group consisting of lenses, mirrors, and prisms;

(f) a cantilever mounted in said moving reference frame and adapted to receive said transmitted light beam;

(g) a light beam position detector adapted to receive light reflected from said cantilever.

2. The scanning force microscope of claim 1 where said scanning means consists of at least one piezoelectric tube.

3. The scanning force microscope of claim 1 further comprising means for adjusting said optical assembly.

4. The scanning force microscope of claim 1 further including a lens which changes the diameter of a beam after said beam is at least partially reflected from said cantilever.

5. The scanning force microscope of claim 1 where said light beam position detector includes at least two light detecting devices.

6. The scanning force microscope of claim 1 where said cantilever is immersed in a fluid during scanning.

7. The scanning force microscope of claim 1 further including means for oscillating said cantilever and means for detecting a change in a parameter of oscillations in said light beam where said light beam is at least partially reflected off said cantilever.

8. A method of imaging a sample with a scanning force microscope comprising the steps of:

(a) providing a cantilever and a light source in a first reference frame;

(b) providing an optical assembly in a second reference frame;

(c) mounting said sample in said second reference frame;

(d) providing relative movement between said first reference frame and said second reference frame;

(e) directing a beam from said light source through said optical assembly and on to said cantilever; and (f) detecting bending of said cantilever.

9. The method of claim 8 further comprising the steps of:

(a) oscillating said cantilever;

(b) detecting a change in a parameter of oscillation of said cantilever as said cantilever is influenced by said sample; and (c) processing said parameter of oscillation to create an image of said sample.

10. A scanning force microscope including a cantilever and a light source mounted in first reference frame and an optical assembly adapted to direct light from the light source to the cantilever, the improvement comprising:

a second reference frame adapted for motion relative to the first reference frame and in which the optical assembly is positioned.

11. The scanning force microscope of claim 10 where said light source is a laser.

12. The scanning force microscope of claim 10 where relative motion between said first reference frame and said second reference frame is created by at least one piezoelectric device.

13. The scanning force microscope of claim 10 where said cantilever deflects as a result of the magnetic fields of said sample.

14. The scanning force microscope of claim 10 where said optical assembly includes at least one adjustable optical component.

15. The scanning force microscope of claim 10 where said optical assembly includes at least one mirror with a curved surface.

16. The scanning force microscope of claim 10 where said cantilever supports a stylus and said stylus intermittently contacts a sample surface.

17. The scanning force microscope of claim 10 where said optical assembly comprises at least one prism.

* * * * *